US012466150B2

(12) United States Patent
Ponti

(10) Patent No.: US 12,466,150 B2
(45) Date of Patent: Nov. 11, 2025

(54) APPARATUS FOR REALISING AT LEAST TWO CONTINUOUS CARDBOARD STRIPS OF DIFFERENT WIDTH FOR PACKAGING BY CONSECUTIVELY JOINING A RESPECTIVE PLURALITY OF CARDBOARD SHEETS FOR PACKAGING OF DIFFERENT WIDTH TO ONE ANOTHER

(71) Applicant: C.M.C. S.P.A., Cerbara-Citta'di Castello (IT)

(72) Inventor: Francesco Ponti, Citta'di Castello (IT)

(73) Assignee: C.M.C. S.P.A., Cerbara (IT)

( * ) Notice: Subject to any disclaimer, the term of this patent is extended or adjusted under 35 U.S.C. 154(b) by 0 days.

(21) Appl. No.: 18/870,438

(22) PCT Filed: May 30, 2023

(86) PCT No.: PCT/IB2023/055524
§ 371 (c)(1),
(2) Date: Nov. 28, 2024

(87) PCT Pub. No.: WO2023/233287
PCT Pub. Date: Dec. 7, 2023

(65) Prior Publication Data
US 2025/0319684 A1 Oct. 16, 2025

(30) Foreign Application Priority Data
Jun. 1, 2022 (IT) ........................ 102022000011597

(51) Int. Cl.
*B31B 50/00* (2017.01)
*B31B 50/06* (2017.01)
(Continued)

(52) U.S. Cl.
CPC .............. *B31B 50/06* (2017.08); *B31B 50/16* (2017.08); *B31B 50/624* (2017.08); *B31F 5/04* (2013.01)

(58) Field of Classification Search
CPC ....... B31B 50/06; B31B 50/16; B31B 50/624; B31B 2110/35; B31B 50/00;
(Continued)

(56) References Cited

U.S. PATENT DOCUMENTS

2004/0005976 A1* 1/2004 Ospina .................... B31B 50/00 493/51
2021/0347139 A1* 11/2021 Ponti ....................... B31B 50/07

FOREIGN PATENT DOCUMENTS

EP 2890554 7/2015
EP 3521006 8/2019
(Continued)

OTHER PUBLICATIONS

"International Search Report (Form PCT/ISA/210) of PCT/IB2023/055524", mailed on Aug. 22, 2023, pp. 1-3.
(Continued)

*Primary Examiner* — Jacob A Smith
(74) *Attorney, Agent, or Firm* — JCIPRNET

(57) ABSTRACT

The apparatus for realising at least two continuous cardboard strips for packaging having different width by consecutively joining to one another at least two respective pluralities of cardboard sheets for packaging of different width, comprises: a first store, for containing a first stack of a first plurality of cardboard sheets each having a first width; a second store, for containing a second stack of a second plurality of cardboard sheets each having a second width, wherein the second store is arranged upstream of the first store and at a raised height with respect to the first store. The apparatus further comprises a first operating station, which
(Continued)

is arranged above the first store and which is designed to reciprocally join the sheets of the first stack and realise a first continuous cardboard strip having a first width, and a second operating station which is arranged above the second store, and which is designed to reciprocally join the sheets of the second stack and realise a second continuous cardboard strip having a second width.

14 Claims, 14 Drawing Sheets

(51) Int. Cl.
*B31B 50/16* (2017.01)
*B31B 50/62* (2017.01)
*B31F 5/04* (2006.01)

(58) Field of Classification Search
CPC ........ B31B 2100/00; B31B 2120/0102; B31B 2120/502; B31F 5/04; B31F 1/28; B31F 1/2804; B31F 1/2822; B31F 1/2831; B31F 5/00; B65B 2210/04; B65B 5/024; B65B 11/004; B65B 43/10; B65B 43/126; B65B 23/20; B65B 5/04; B65B 41/06
USPC ..... 493/51, 59, 162, 357, 363, 397, 415, 56; 53/429, 434, 207, 438
See application file for complete search history.

(56) References Cited

FOREIGN PATENT DOCUMENTS

| | | |
|---|---|---|
| WO | 2010091043 | 8/2010 |
| WO | 2015173744 | 11/2015 |
| WO | 201873770 | 4/2018 |
| WO | 2020079557 | 4/2020 |

OTHER PUBLICATIONS

"Written Opinion of the International Searching Authority (Form PCT/ISA/237) of PCT/IB2023/055524", mailed on Aug. 22, 2023, pp. 1-7.

* cited by examiner

APPARATUS FOR REALISING AT LEAST TWO CONTINUOUS CARDBOARD STRIPS OF DIFFERENT WIDTH FOR PACKAGING BY CONSECUTIVELY JOINING A RESPECTIVE PLURALITY OF CARDBOARD SHEETS FOR PACKAGING OF DIFFERENT WIDTH TO ONE ANOTHER

CROSS-REFERENCE TO RELATED APPLICATION

This application is a 371 application of the International PCT application serial no. PCT/IB2023/055524, filed on May 30, 2023, which claims the priority benefits of Italy Patent Application No. 102022000011597, filed on Jun. 1, 2022. Each of the entirety of the above-mentioned patent applications is hereby incorporated by reference herein and made a part of this specification.

FIELD OF THE INVENTION

The present invention relates to the technical sector concerning the packaging of articles by enveloping them with a cardboard sheet for packaging.

In particular, the invention relates to an apparatus for realising at least two continuous cardboard strips for packaging, having different width, by consecutively joining a respective plurality of cardboard sheets of different width for packaging to one another.

DESCRIPTION OF THE PRIOR ART

Machines are known for packaging articles, which use a continuous cardboard strip for carrying out the packaging operations of the articles.

For example, document EP 2 890 554 describes a machine of this type.

The continuous cardboard strip is wound and stocked in reels or in fan-folds, i.e. in stores in which the cardboard strip is folded on itself and in a bellows-fashion.

The cardboard strip is unwound from the reel or extracted from the fan-fold, then to be cut on the basis of the dimensions of the article, or group of articles, which has to be wound and packaged, so as to obtain a cardboard sheet having appropriate dimensions for being wrapped around the article, or group of articles.

However, the supply of the cardboard strips stocked in reels, or in fan-folds, for the operation of the packaging machines, is particularly expensive, and thus, for the users of these packaging machines, this aspect undoubtedly constitutes a drawback.

The stores for containing the continuous cardboard strips are also very voluminous and the means necessary for extracting the continuous strips and directing them towards the machines for cutting them into cardboard sheets for packaging the relative articles require a great deal of manoeuvring space. Document WO201873770 describes an apparatus for realising a continuous cardboard strip starting from cardboard sheets all having a predetermined and same width, which are collected from relative stores and joined to one another, using glue, to form a continuous cardboard strip.

The continuous cardboard strip will then be cut time by time so as to obtain, on the basis of the dimensions and shape of the articles to be packaged, single cardboard sheets for packaging of appropriate dimensions, to be used for packaging the articles.

The articles to be packaged, however, can be of differing dimensions and shape, so it is therefore necessary to carry out various cutting operations, especially in the width dimension, in order to adapt the cardboard sheet, once cut from the continuous cardboard strip, to the articles that are to be packaged, with a consequent significant exuberance and waste of material.

SUMMARY OF THE INVENTION

The aim of the present invention consists in obviating the drawbacks as set out in the preamble.

In particular, an aim of the present invention is to describe an apparatus for realising at least two continuous cardboard strips for packaging, having different width, by consecutively joining a respective plurality of cardboard sheets of different width for packaging to one another, and which can therefore be used in association with a packaging machine, so as to enable a reduction of costs, as the provision of single cardboard sheets of different width, including as a function of the dimensions and shape of the articles to be packaged, is without doubt less expensive with respect to the costs for an already-stored strip in a reel or fan-fold form, as well as enabling a saving in terms of waste material.

The stated aims are obtained with an apparatus for realising at least two continuous cardboard strips for packaging, having different width, by consecutively joining a respective plurality of cardboard sheets for packaging of different width, according to the contents of the claims.

BRIEF DESCRIPTION OF THE DRAWINGS

A preferred embodiment of the apparatus of the invention is described in the following with reference to the appended tables of drawings, in which.

DESCRIPTION OF PREFERRED EMBODIMENTS

Figure 1A:
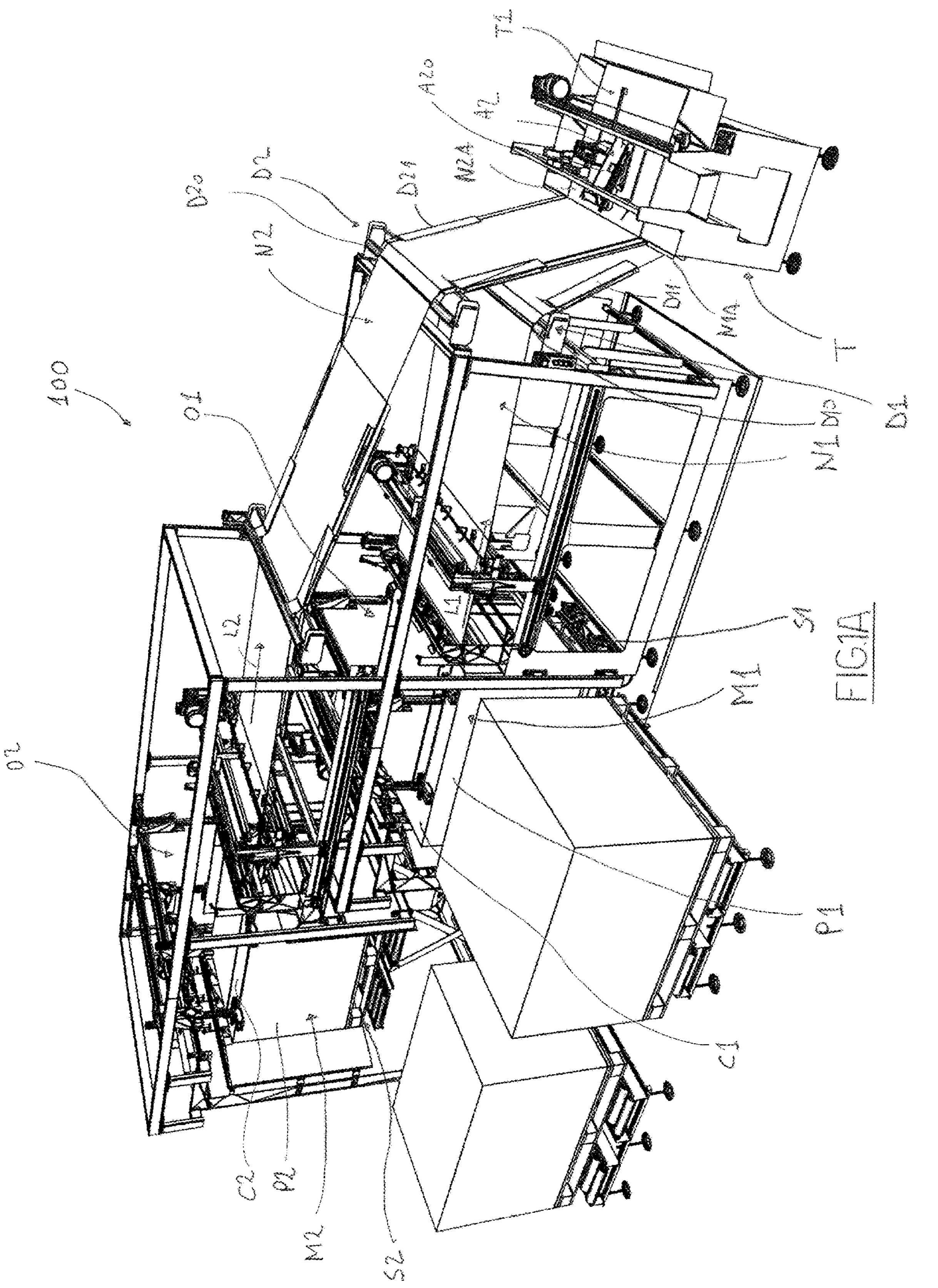
FIG. 1A illustrates, in a schematic and perspective view, the apparatus of the invention, in its entirety, for realising at least two continuous cardboard strips for packaging of different width starting from a respective plurality of cardboard sheets having different length which are respectively joined to one another to form the two continuous cardboard strips.
Figure 1B:
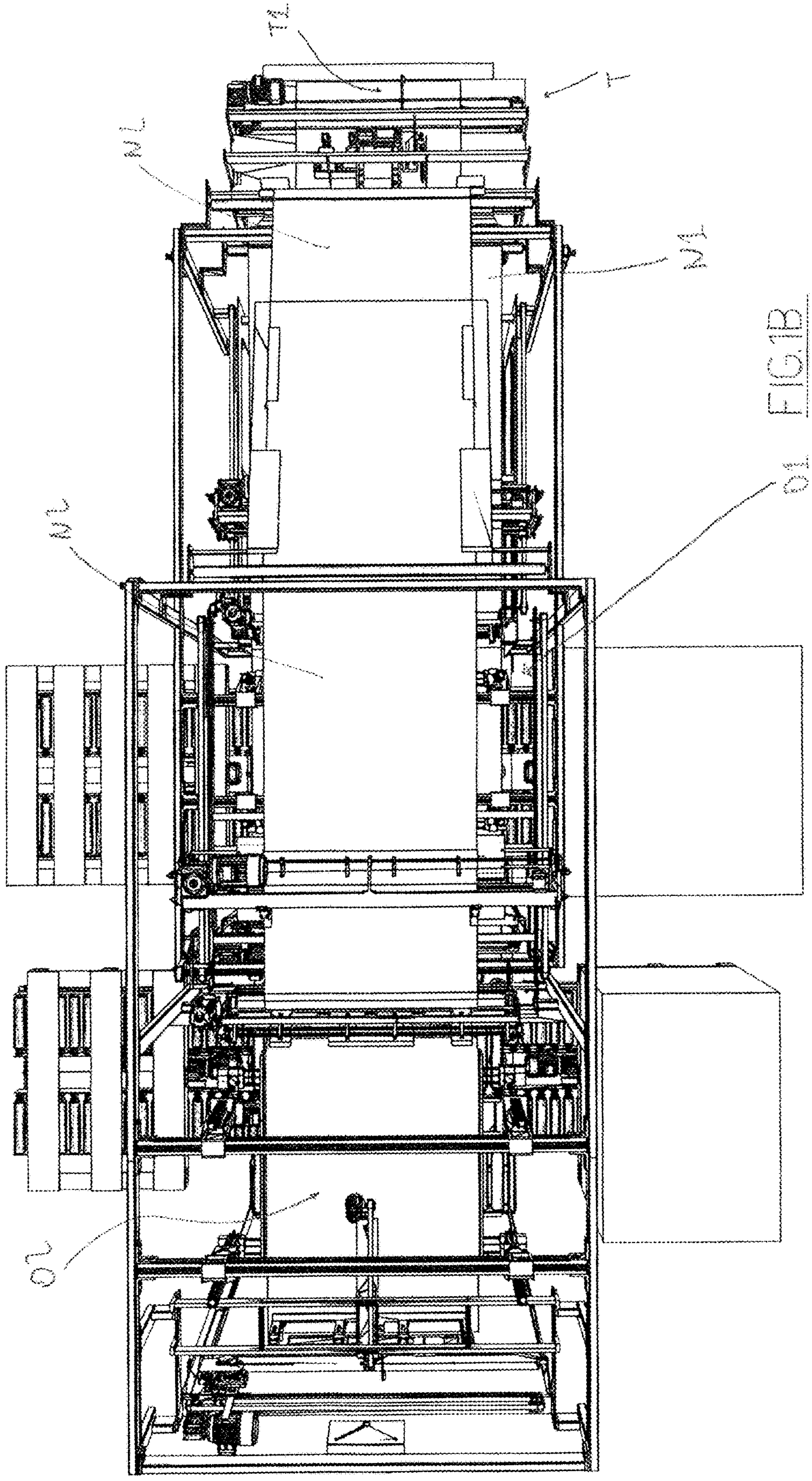
FIG. 1B is a plan view from above of the apparatus of the invention of FIG. 1A.
Figure 1C:
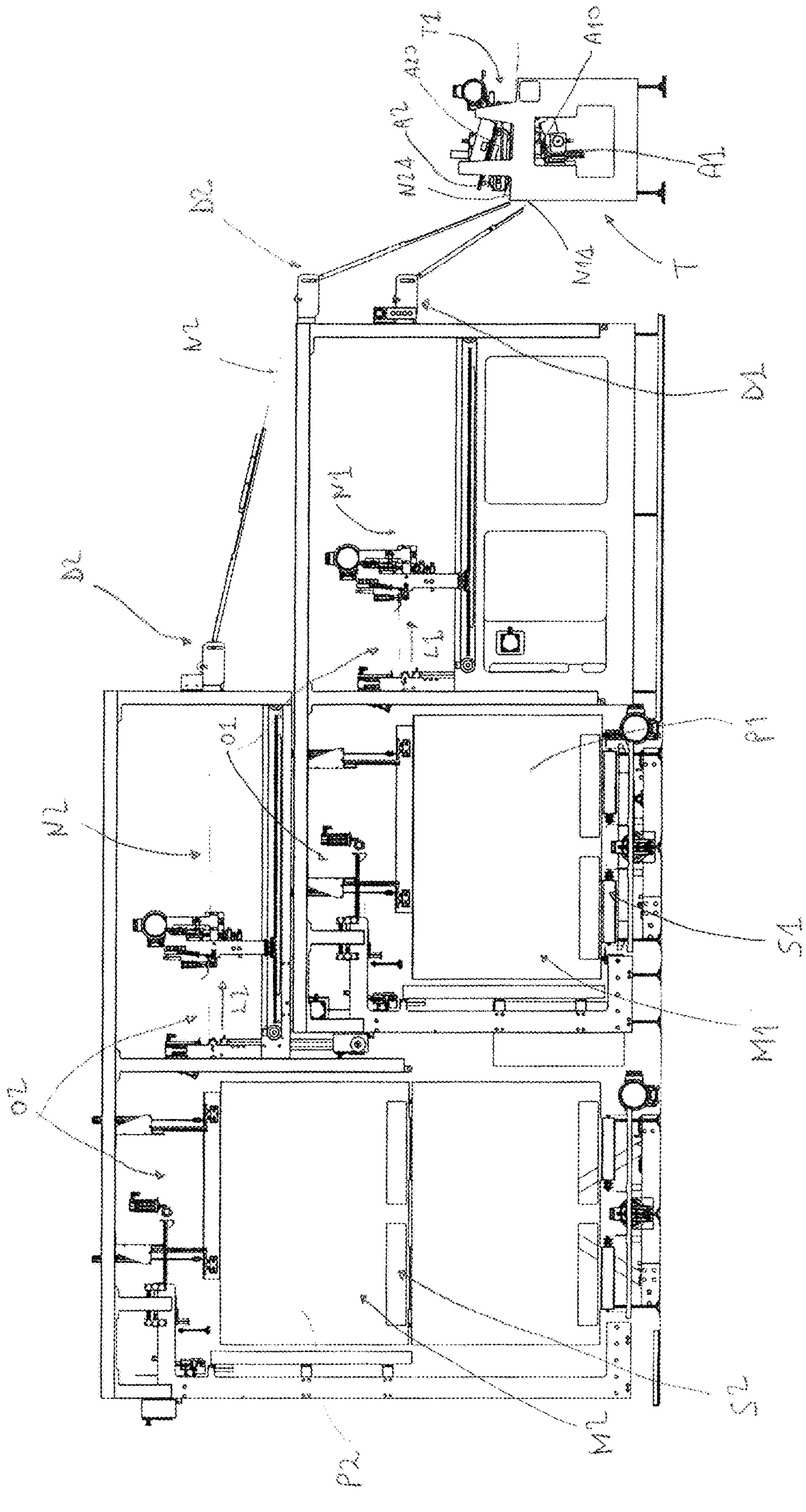
FIG. 1C is a schematic lateral view of the apparatus of the invention of FIG. 1A.
Figure 2A:
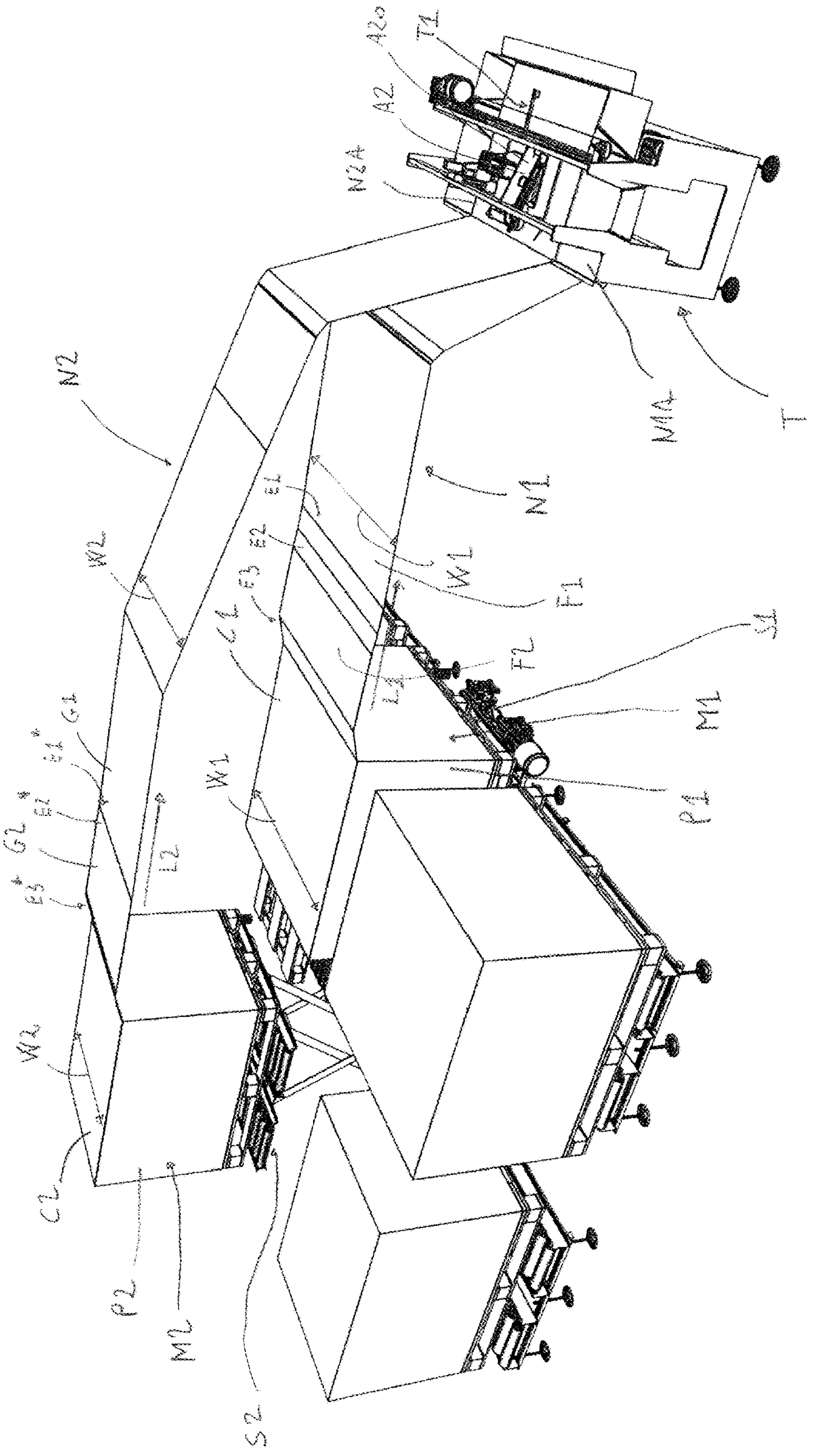
FIG. 2A illustrates, schematically and according to a perspective view the two continuous cardboard strips for packaging having a different width with respect to one another which can be obtained with the apparatus of the invention.
Figure 2B:
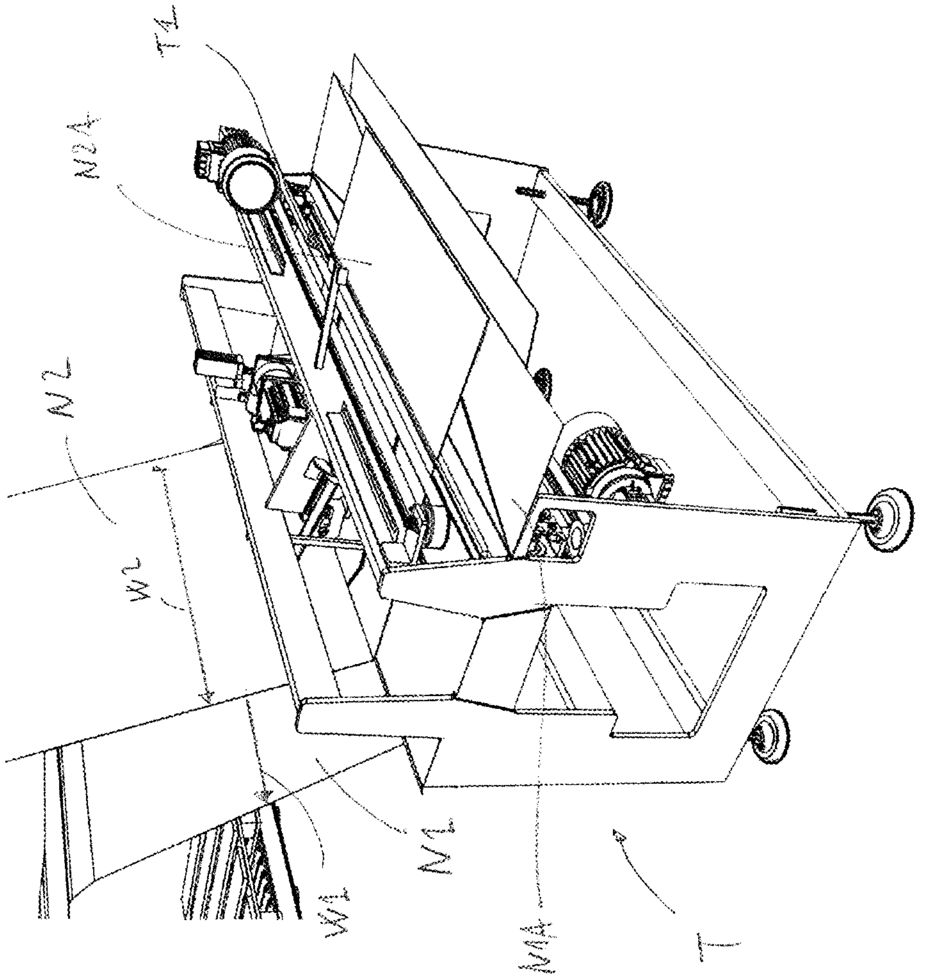
FIG. 2B illustrates, in a schematic and perspective view, a terminal part of the apparatus of the invention of FIG. 1A, at which respective single cardboard sheets are cut from the two continuous cardboard strips for packaging obtained with the apparatus of the invention and destined to be used by a packaging machine for packaging articles.
Figure 3A:
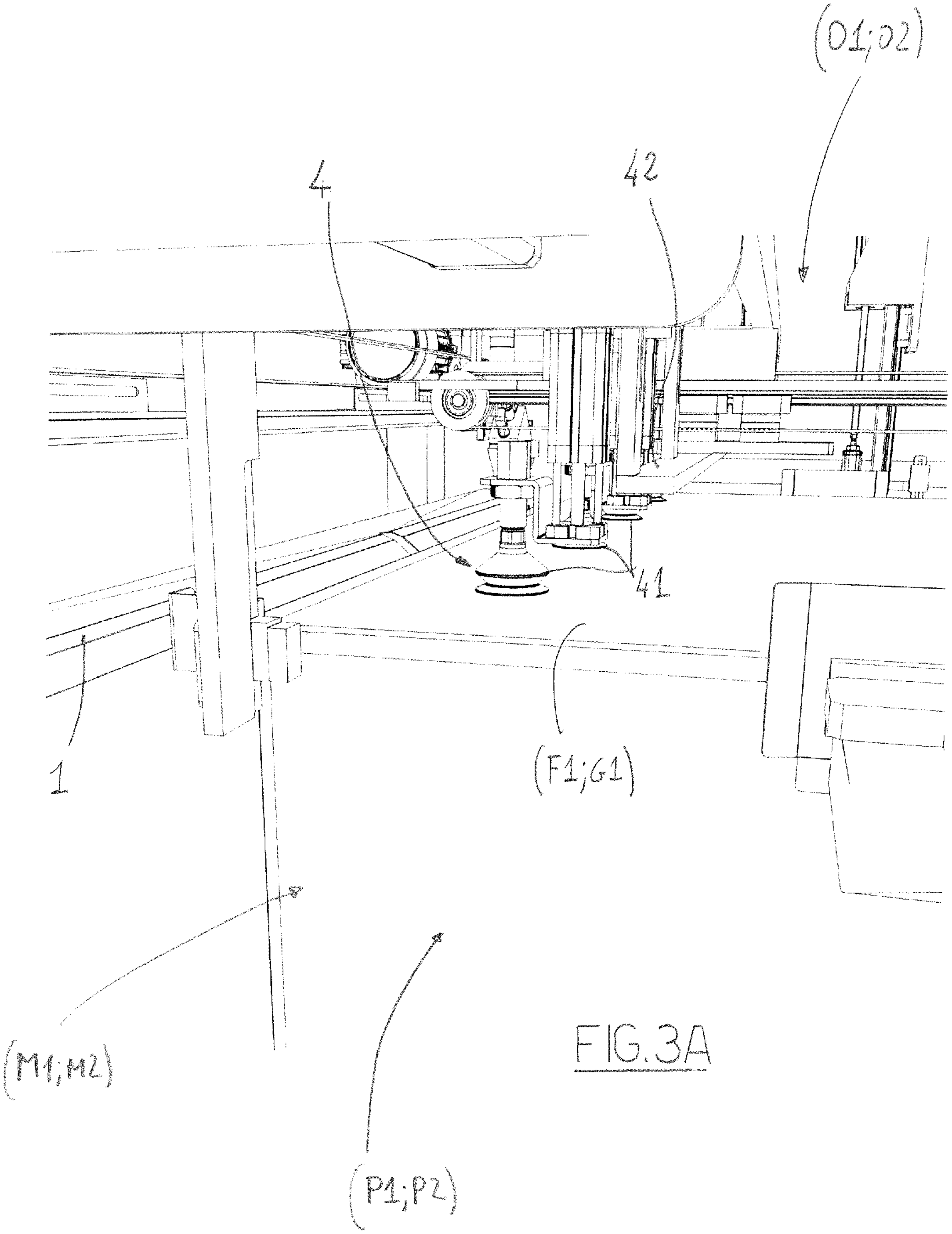
FIGS. 3A to 3C illustrate, in a larger scale and in relative schematic perspective views, an operating sequence of some significant components of the apparatus of the invention, present in each of the two operating stations for realising the two continuous cardboard strips, for the application of adhesive material on an end portion of a cardboard sheet.
Figure 3B:
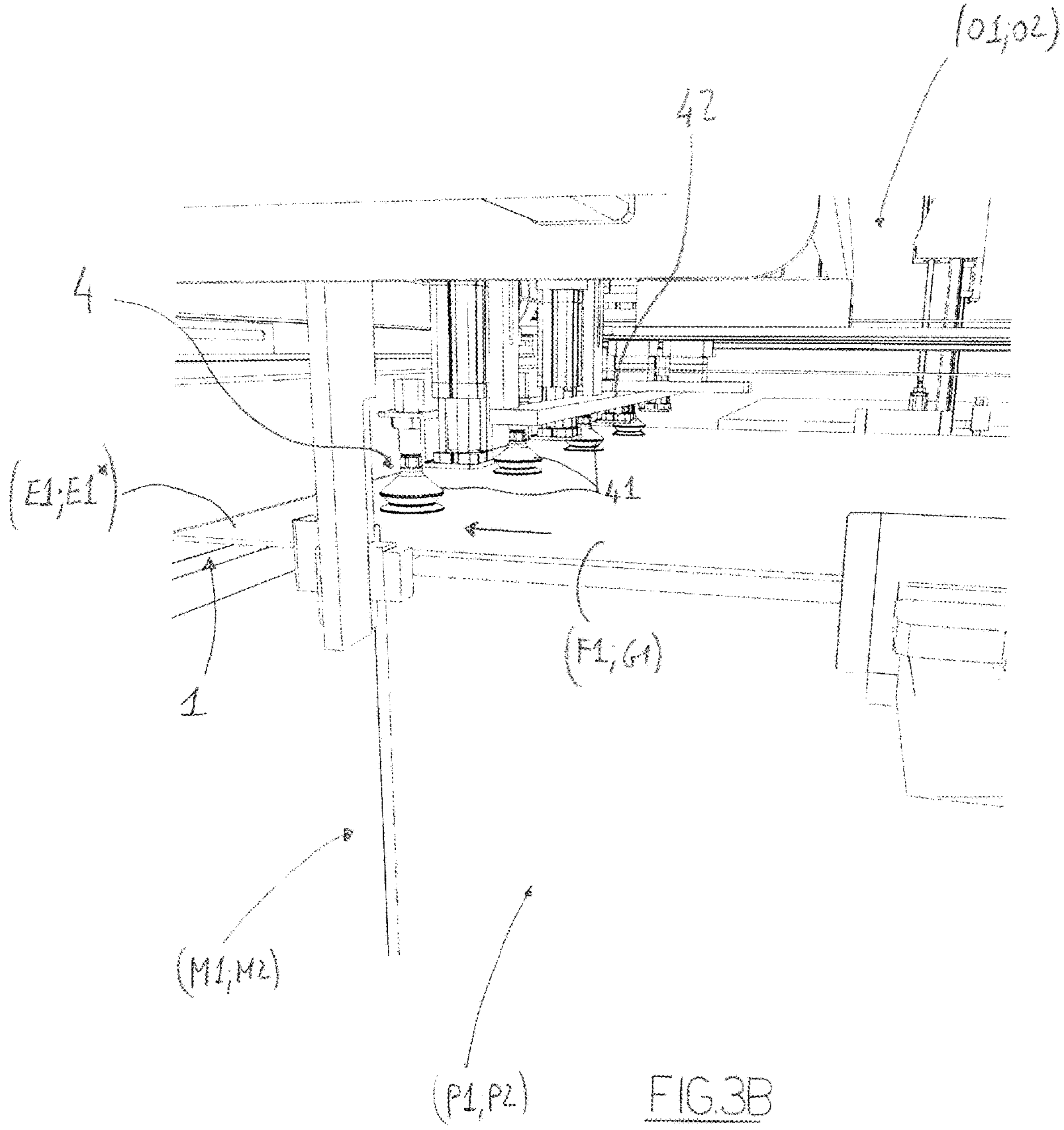
Figure 3C:
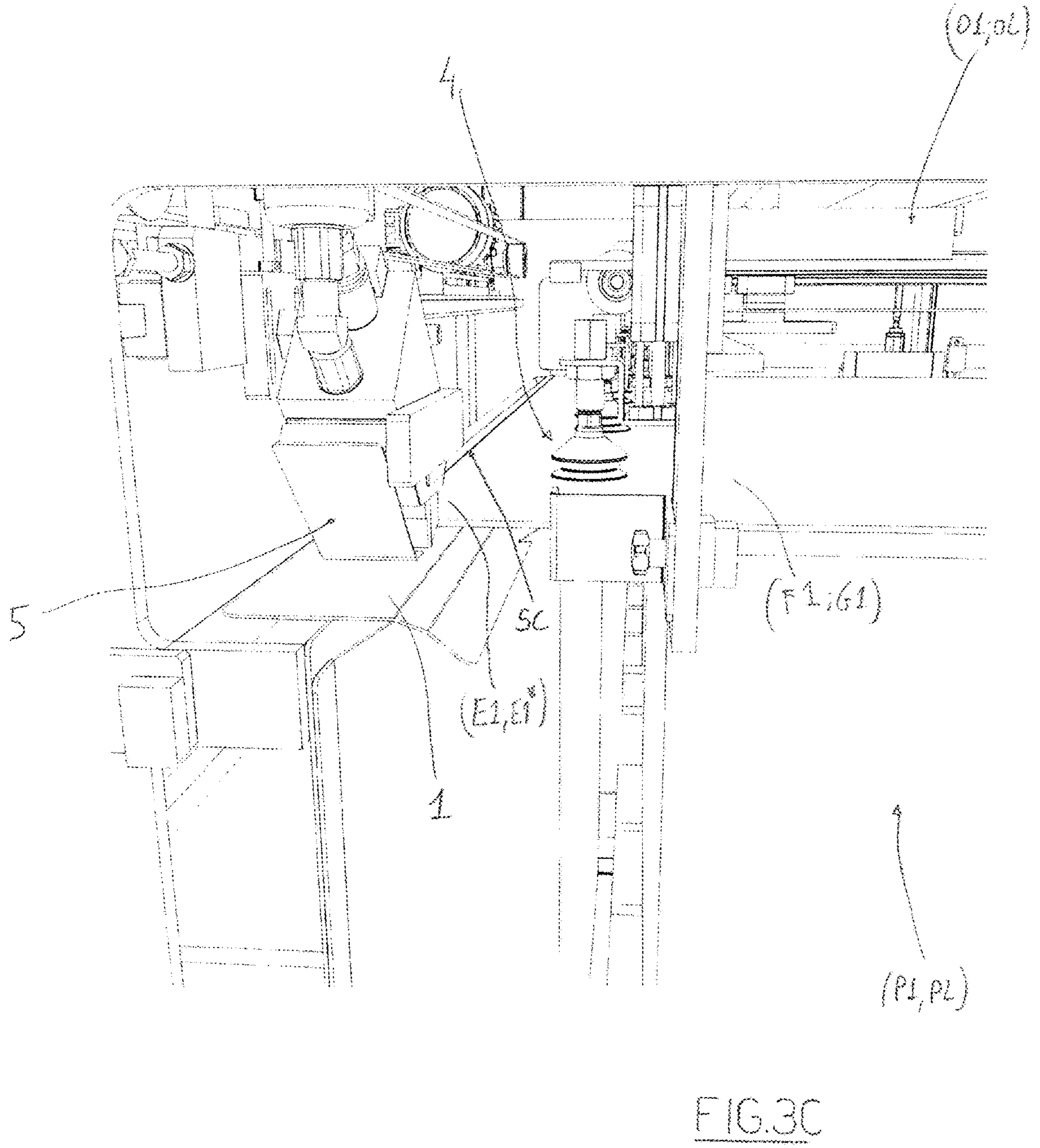

With reference to the appended tables of drawings, reference numeral (100) denotes the apparatus for realising at least two continuous cardboard strips for packaging of different width, by consecutively joining to one another at least two respective pluralities of cardboard sheets for packaging of different width, object of the present invention in its entirety.

The apparatus described by the present invention is able to join a first series of cardboard sheets to one another each having a first width (W1) and, at the same time, to join a second series of cardboard sheets to one another each having a second width (W2), and therefore make contemporaneously available, to a machine for packaging articles, or groups of articles, a first continuous cardboard strip (N1) having a first width (W1) and a second continuous cardboard strip (N2) having a second width (W2), different to the first width, being is larger or smaller.

As it is not the object of the invention, the machine for packaging articles has not been illustrated in the various figures, but it will be arranged immediately downstream of the terminal part of the apparatus of the invention, at which terminal part, as will be seen in the following, respective cardboard sheets will be cut from the first continuous cardboard strip or second continuous cardboard strip which sheets have suitable dimensions for packaging determined articles or groups of articles.

In this way, with the apparatus of the invention, according to the effective dimensions of the articles, or the group of articles to be packaged, in particular of the extension of the rest base thereof, time by time it will be possible to cut, from either the first continuous cardboard strip or the second continuous cardboard strip, a corresponding cardboard sheet of adequate width to be used for the packaging of the articles, or group of articles, and such as to reduce to a minimum the quantity of waste material.

The main characteristics of the apparatus (100) of the present invention, in the preferred embodiment illustrated in the figures of the drawings (see for example FIGS. 1A, 1B, 1C, 2A, 2B) are the following.

The apparatus (100) is made in such a way as to comprise:

- a first store (M1), configured so as to contain a first plurality of cardboard sheets (C1) each having a first width (W1), stacked on one another to form a first stack (P1);
- a second store (M2), which is configured for containing a second plurality of cardboard sheets (C2), each having a second width (W2) (for example smaller than the first width (W1), as illustrated in the figures, but which can also be greater), stacked on one another to form a second stack (P2), wherein the second store (M2) is arranged upstream of the first store (M1) and at a raised height with respect to the first store (M1) (the reciprocal arrangement of the two stores can also be different, for example with the second store (M2) downstream of the first store (M1)).

The apparatus (100) further comprises:

- a first operating station (O1), which is arranged above the first store (M1), and a second operating station (O2) which is arranged above the second store (M2).

The first operating station (O1) is configured to cyclically collect a first sheet (F1) having the first width (W1) from the first stack (P1) of sheets, to apply adhesive material on a first transversal end portion (E1) of the first sheet (F1), to transfer the first sheet (F1) along a first longitudinal advancement direction (L1) with respect to the first store (M1) and to position the first sheet (F1) downstream of the first store (M1) with the first transversal end portion (E1) of the first sheet (F1) arranged upstream, and then, in succession, to collect a second sheet (F2) having the first width (W1) from the first stack (P1) of sheets, to apply adhesive material on a first transversal end portion (E2) of the second sheet (F2), to transfer the second sheet (F2) along the first longitudinal advancement direction (L1) and position it downstream of the first store (M1) in such a way as to superpose a second transversal end portion (E3) of the second sheet (F2), opposite the first transversal end portion (E2) on which the adhesive material has been applied, above the first transversal end portion (E1) of the first sheet (F1) on which the adhesive material has been applied, and then push and press the second transversal end portion (E3) of the second sheet (F2) against the first transversal end portion (E1) of the first sheet (F1) in such a way as to fix them to one another and form a first continuous cardboard strip (N1) having a width (W1) identical to the first width (W1) of the sheets (C1) present in the first stack (P1) of the first store (M1).

The second operating station (O2), in turn, is configured to pick up, cyclically, a first sheet (G1) having a second width (W2) from the second stack (P2) of sheets, to apply adhesive material on a first transversal end portion (E1*) of the first sheet (G1), to transfer the first sheet (G1) along a second longitudinal advancement direction (L2), arranged superiorly of the first advancement direction (L1), longitudinal with respect to the second store (M2) and to position the second sheet (G2) at the second downstream side of the second store (M2) with the first transversal end portion (E1*) of the first sheet (G1) arranged upstream, and therefore, in succession, to collect a second sheet (G2) having the second width (W2) from the second stack (P2) of sheets, to apply adhesive material on a first transversal end portion (E2*) of the second sheet (G2), to transfer the second sheet (G2) along the second longitudinal advancement direction (L2) and to position the second sheet (G2) at the second downstream side of the second store (M2) in such a way as to superpose a second transversal end portion (E3*) of the second sheet (G2), opposite the first transversal end portion (E2*) on which the adhesive material has been applied, above the first transversal end portion (E1*) of the first sheet (G1) on which the adhesive material has been applied, and then push and press the second transversal end portion (E2*) of the second sheet (G2) against the first transversal end portion (E1*) of the first sheet (G1) in such a way as to fix them to one another and form a second continuous cardboard strip (N2) having a width identical to the second width (W2) of the sheets (C2) present in the second stack (P2) of the second store (M2).

In this way, owing to the contemporaneous presence of the two operating stations, the apparatus of the invention is able to provide, at the same time, both a first continuous cardboard strip and a second continuous cardboard strip having a different width to one another.

Further, the apparatus (100) of the present invention comprises:

- a final cutting station (T), arranged downstream of the first store (M1) and of the second store (M2) with respect to the first longitudinal advancement direction (L1) and to the second longitudinal advancement direction (L2), and comprising cutting means (T1) for cutting a cardboard sheet from a continuous cardboard strip;

first directing means (D1), which are arranged downstream of the first store (M1), and which are configured to advance the first continuous cardboard strip (N1) and switch it in such a way that an advanced portion (N1A) of the first continuous cardboard strip (N1) is fed into and positioned at the final cutting station (T);

second directing means (D2), which are arranged downstream of the second store (M2), and which are configured to advance the second continuous cardboard strip (N2) and switch it in such a way that an advanced portion (N2A) of the second continuous cardboard strip (N2) is fed into and positioned at the final cutting station (T), above the advanced portion (N1A) of the first continuous cardboard strip (N1).

In detail, the apparatus (100) further comprises:

first advancement means (A1), which are arranged in the final cutting station (T) and which are configured to contact the advanced portion (N1A) of the first continuous cardboard strip (N1);

and second advancement means (A2), which are arranged in the final cutting station (T) and which are configured to contact the advanced portion (N2A) of the second continuous cardboard strip (N2).

In this regard, the apparatus (100) of the invention is configured in such a way that:

the first advancement means (A1) and the second advancement means (A2) are alternatively activatable in such a way as to advance the first continuous cardboard strip (N1) or the second continuous cardboard strip (N2) to the cutting means (T1) in such a way that the cutting means (T1) (for example constituted by a cutting blade that is movable transversally of the cardboard strips by means of a belt) can be activated to cut the first continuous cardboard strip (N1), and obtain a first cardboard sheet for packaging having the first width (W1) for packaging a respective first article, or first group of articles, or to cut the second continuous cardboard strip (N2), and obtain a second cardboard sheet for packaging having the second width (W2) for packaging a respective second article, or second group of articles.

Therefore, as previously mentioned, and according to the effective dimensions of the articles, or the group of articles, to be packaged, and thus on the basis of the effective extension of the rest base thereof, the apparatus of the invention will activate the first (A1) or second (A2) advancement means is made in such a way as to make available, to the cutting means (T1), the first (N1) or the second (N2) continuous cardboard strip having a width that is appropriate for the dimensions of the articles, or group of articles, to be packaged.

In this way, it will be possible to obtain and make available, time by time, at the entry of the packaging machine, a cardboard sheet having a width that is appropriate for the dimensions of the articles to be packaged, and consequently reduce as much as possible the waste of material, i.e. reduce the dimensions and quantities of the cardboard waste that will be cut from the packaging machine for realising the packaging sheet from the cardboard sheet supplied in entry to the apparatus of the invention.

Other advantageous characteristics of the apparatus of the invention are described in the following.

The first directing means (D1) comprise first advancement rollers (D10) and a series of first guide plates (D11) which are arranged inclined to guide the first continuous cardboard strip (N1) which is formed downstream of the first store (M1) and to switch the first continuous cardboard strip (N1) from the first longitudinal advancement direction (L1) towards the entry of the final cutting station (T), while in turn the second directing means (D2) comprise second advancement rollers (D20) and a series of second guide plates (D21) which are arranged, inclined, to guide the second continuous cardboard strip (N2), which is formed downstream of the second store (M2), and to switch the second continuous cardboard strip (N2) from the second longitudinal advancement direction (L2) towards the entry of the final cutting station (T). According to the preferred embodiment illustrated in the figures, see for example FIGS. 1A, 1C, 2A, the first advancement means (A1) comprise at least a first closed and loop-wound belt (A10) which is arranged in the final cutting station (T) in such a way as to abut and contact, for example superiorly, the advanced portion (N1A) of the first continuous cardboard strip (N1).

The first closed and loop-wound belt (A10) is activatable in order to advance the first continuous cardboard strip (N1) to the cutting means (T1).

In a like way, the second advancement means (A2) comprise at least a second closed and loop-wound belt (A20) which is arranged in the final cutting station (T) in such a way as to abut and contact, for example superiorly, the advanced portion (N2A) of the second continuous cardboard strip (N2).

The second closed and loop-wound belt (A20) is activatable in order to advance the second continuous cardboard strip (N2) to the cutting means (T1).

In a preferred aspect, the first store (M1) is arranged above the first lifting means (S1) and the second store (M2) is arranged above the second lifting means (S2). For example, both the first and second lifting means can be made in such a way as to comprise a respective support plane, for supporting the stacks of sheets, which is raisable (or lowerable) by means of a pantograph structure.

In particular, the first lifting means (S1) and the second lifting means (S2) are configured to raise and/or lower the first store (M1) and the second store (M2) as a function of the heights of the first stack (P1) of sheets and of the second stack (P2) of sheets, and/or to maintain the top of the first stack (P1) of sheets constantly at a first height from the ground surface and the top of the second stack (P2) of sheets constantly at a second height from the ground surface, greater than the first height.

According to the preferred but not exclusive embodiment illustrated in the figures, the apparatus of the invention can be realised in such a way that both the first operating station (O1) and the second operating station (O2), responsible for realising the two continuous cardboard strips starting from the cardboard sheets contained in the two stacks of sheets positioned in the two stores, are each made in the following way.

With reference to FIGS. 3A to 3C, and FIGS. 4A to 4F, the first operating station (O1) and the second operating station (O2) are realised and configured in such a way as each to comprise:

a first support (1), which is arranged at a first upstream side of the first/second store (M1, M2), and which is configured and predisposed to be able to restingly receive a first transversal end portion (E1, E1*; E2, E2*) of a cardboard sheet (F1, F2, G1, G2);

a second support (2) arranged on a second downstream side of the first/second store (M1, M2), opposite the first upstream side, so as to be on the opposite side to the first support (1) with respect to the first/second store (M1, M2), and which is arranged and configured to restingly receive a cardboard sheet (F1; G1; F2; G2) so that the first transversal end portion (E1, E2, E1*, E2*) of the first cardboard sheet (F1, G1; F2, G2) is projecting from the second support (2) and facing towards the first/second store (M1, M2);

a third support (3), which is arranged between the second support (2) and the first/second store (M1, M2), and is movable between a first raised configuration(S), in which a part (31) of the third support (3) is raised with respect to the second support (2), and a second lowered configuration (A) in which the part (31) of the third support (3) is lowered with respect to the second support (2).

Each of the first operating station (O1) and the second operating station (O2) further comprises:

gripping means (4), which are arranged and configured to pick up a first cardboard sheet (F1, G1) from the top of the first/second stack (P1, P2) of cardboard sheets present in the first/second store (M1, M2) and to transfer to and position the first cardboard sheet (F1, G1) at the first support (1) so that a first transversal end portion (E1, E1*) of the first cardboard sheet (F1, G1) is resting on the first support (1);

application means (5) of an adhesive material, which are arranged and configured to apply adhesive material on the upper face of the first transversal end portion (E1, E1*) of the first cardboard sheet (F1, G1) rested on the first support (1);

transfer means (6), which are arranged and configured to transfer the first cardboard sheet (F1, G1), on which the adhesive material has been applied, from the first/second store (M1, M2) along the first/second longitudinal advancement direction (L1, L2) towards the second support (2), so that the first cardboard sheet (F1, G1) is rested on the second support (2) with the relative first transversal end portion (E1, E1*) on which the adhesive material has been applied remaining projecting and facing upstream towards the store first/second store (M1, M2), pressor means (7), arranged and configured so as to be activatable between the second support (2) and the third support (3).

In greater detail, each of the first operating station (O1) and the second operating station (O2) is configured in such a way that the third support (3) is activatable in order to be positioned in the first raised configuration(S), so as to switch and raise a second transversal end portion (E3, E3*) of a second cardboard sheet (F2, G2) which is transferred from the first/second store (M1, M2) along the first/second longitudinal advancement direction (L1, L2) towards the second support (2) by the transfer means (6), in such a way that the second transversal end portion (E3, E3*) of the second sheet (F2, G2), which is raised, is positioned above the first transversal end portion (E1, E1*) of the first cardboard sheet (F1, G1) on which the adhesive material has been applied and is projecting from the second support (2), with the third support (3) then being activatable so as to be positioned in the second lowered configuration (A) so as to lower the second transversal end portion (E3, E3*) of the second sheet (F2, G2) and position it at the first transversal end portion (E1, E1*) of the first sheet (F1, G1) on which the adhesive material is present so that the two end portions (E1, E1*, E3, E3*) are in contact with one another.

In turn, the pressor means (7), once the third support (3) has been positioned in the second lowered configuration (A) and the second transversal end portion (E3, E3*) of the second sheet (F2, G2) has been superposed and positioned at the first transversal end portion (E1, E1*) of the first sheet (F1, G1) projecting from the second support (2), are activatable transversally to the two sheets (F1, G1, F2, G2), between the second (2) and the third support (3), so as to press the two superposed end portions (E1, E1*, E3, E3*) of the two sheets (F1, G1; F2, G2) in order to fix them to one another and to form the first/second continuous cardboard strip (N1, N2).

The special arrangement of the first support element (1), on which is placed a first transversal end portion of a cardboard sheet for application of the adhesive material, arranged at a first upstream side of the first/second store (M1, M2), and the arrangement of the second (2) and third support (3), between which the joining and anchoring between the two cardboard sheets takes place, on a second downstream side, opposite the first side of the first/second store (M1, M2), makes the operations of realising the two continuous cardboard strips rapid and effective, as the cardboard sheets which are to be picked up from the first/second stack of cardboard sheets present in the first/second store (M1, M2), are moved in a straight manner along the first/second longitudinal direction (L1, L2).

In a further preferred aspect, the gripping means (4) are configured, when the transfer means (6) have transferred the first cardboard sheet (F1; G1) towards the second support (2), in such a way as to pick up the second cardboard sheet (F2; G2) from the top of the first/second stack (P1, P2) of cardboard sheets (C1, C2) present in the first/second store (M1, M2) and to transfer to and position the second cardboard sheet (F2, G2) at the first support (1) so that a first transversal end portion (E2, E2*) of the second cardboard sheet (F2; G2) is resting on the first support (1).

Further, once the adhesive material has been applied on the first transversal end portion (E2, E2*) of the second sheet (F2; G2) by the application means (5) of adhesive material, the transfer means (6) are configured so as to transfer the second cardboard sheet (F2; G2) towards the second support (2) so that a second transversal end portion (E3, E3*) of the second cardboard sheet (F2; G2), opposite the first transversal end portion (E2, E2*) on which the adhesive has been applied, can first be lifted, by means of the third support (3) positioned in the first raised configuration(S), and then positioned, following the positioning of the third support (3) in the second lowered configuration (A), above and in contact with the first transversal end portion (E1, E1*) of the first cardboard sheet (F1; G1) projecting from the second support element (2).

Thus, in order to obtain the continuous cardboard strip by joining the first continuous cardboard strip and the second continuous cardboard strip, by joining two cardboard sheets at a time in succession, each of the first operating station (O1) and the second operating station (O2) is such that:

the gripping means (4), are configured to be cyclically activatable to pick up successive single cardboard sheets from the top of the stack (P) of the first/second stack (P1, P2) of cardboard sheets (C1, C2) present in the first/second store (M1, M2) and to cyclically transfer to and position the successive single cardboard sheets at the first support (1) so that a first transversal end portion of the successive single cardboard sheets is resting on the first support (1) and the application means (5) of adhesive material apply the adhesive material on the upper surface of the first transversal end portion; while the transfer means (6) are configured and predisposed to cyclically transfer the successive single cardboard sheets, on which the adhesive material has been applied, towards the second support (2) and the third support (3) is cyclically activatable in order first to be positioned in the first raised configuration(S) so as to switch and lift a second end portion of the successive single sheets, opposite the first transversal end portion on which the adhesive material has been applied, so that the second end portion of the successive single sheets is positioned above the transversal end portion of a preceding single sheet resting on the second support (2), on which transversal end portion the adhesive material had been applied, and is then activatable so as to be positioned in the second lowered configuration (A) in order to lower the second transversal end portion of the successive single sheets, positioning the second transversal end portion at the transversal end portion of the preceding single sheet on which the adhesive material has been applied so that the two end portions are in contact with one another, and, in turn, cyclically, the pressor means (7), once the third support (3) has been positioned in the second lowered configuration (A) and the second transversal end portion of the successive single sheets has been superposed and positioned on the transversal end portion of the preceding sheet, are activatable in such a way as to press the two transversal end portions of the two sheets to one another and form the first/second continuous cardboard strip (N1, N2).

In order advantageously to make the transfer operations of the sheets towards the second support (2) more rapid, i.e. towards the area in which the sheets have to be joined together, once the adhesive material has been applied thereon, the gripping means (4) are configured to collect, by suction, a cardboard sheet from the top of the first/second stack (P1, P2) of cardboard sheets (C1; C2) present in the first/second store (M1; M2) and transfer the cardboard sheet towards the first support (1) so that a first transversal end portion of the cardboard sheet is resting on the first support (1), and are configured, once the application means (5) of the adhesive material have applied adhesive material on the upper surface of the transversal end portion of the cardboard sheet rested on the first support (1), so as to transfer the cardboard sheet in the direction of the second support (2), by sliding the cardboard sheet on the first/second stack (P1, P2) of cardboard sheets (C), and then release the cardboard sheet to enable the transfer means (6) to further transfer the cardboard sheet towards the second support (2).

According to the preferred embodiment illustrated in the figures, the gripping means (4) comprise a series of suction gripping elements (41) borne, vertically mobile, by a first frame (42) activatable in translation above the first/second stack of sheets (P1; P2) present in the first/second store (M1; M2), towards the first support (1) and towards the second support (2).

In turn, and still based on the preferred embodiment illustrated for each of the first and second operating station (O1, O2), the transfer means (6) comprise rollers (61) mounted on a shaft (62) activatable in rotation by a motor, with the shaft (62) being borne by a second frame (63) movable vertically so as to be able to lower the rollers (61) in such a way that the rollers (61) can abut the cardboard sheet on which the adhesive material has been applied and, when activated in rotation by the rotation of the shaft (62), can transfer the cardboard sheet towards the second support (2).

The second frame (63) is further movable vertically upwards so as to be able to raise the rollers (61) in connection with the passage of the portion of the cardboard sheet on which the adhesive material has been applied in such a way that the rollers (61) do not touch the adhesive material.

In particular, the second frame (63) is predisposed between the third support (3) and the first/second store (M1, M2).

The pressor means (7) of each of the first/second operating station (O1, O2) are conformed so as to comprise two counter-rollers (71, 72), a first counter-roller (71) which is superiorly and transversally movable at the two superposed transversal end portions of the two sheets to be joined, while a second counter-roller (72), opposite the first counter-roller, is inferiorly and transversally movable at the two superposed end portions of the two sheets.

Figure 4A:
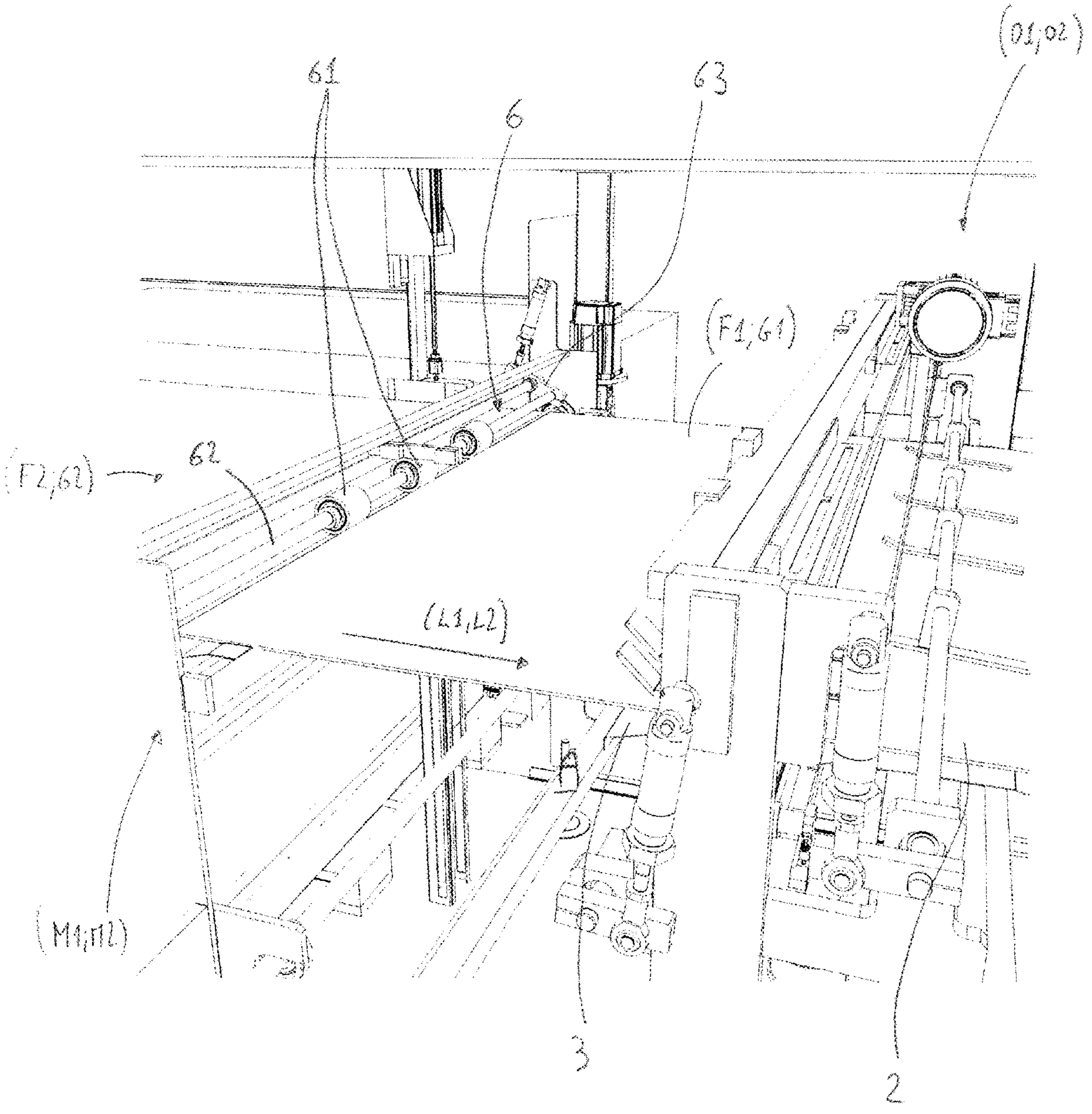
FIGS. 4A to 4F illustrate, in a larger scale and in respective schematic perspective views, an operating sequence of further components of the apparatus of the invention, present in each of the two operating stations for realising the two continuous cardboard strips, for superposing end parts of two cardboard sheets and for the reciprocal fixing thereof.
Figure 4B:
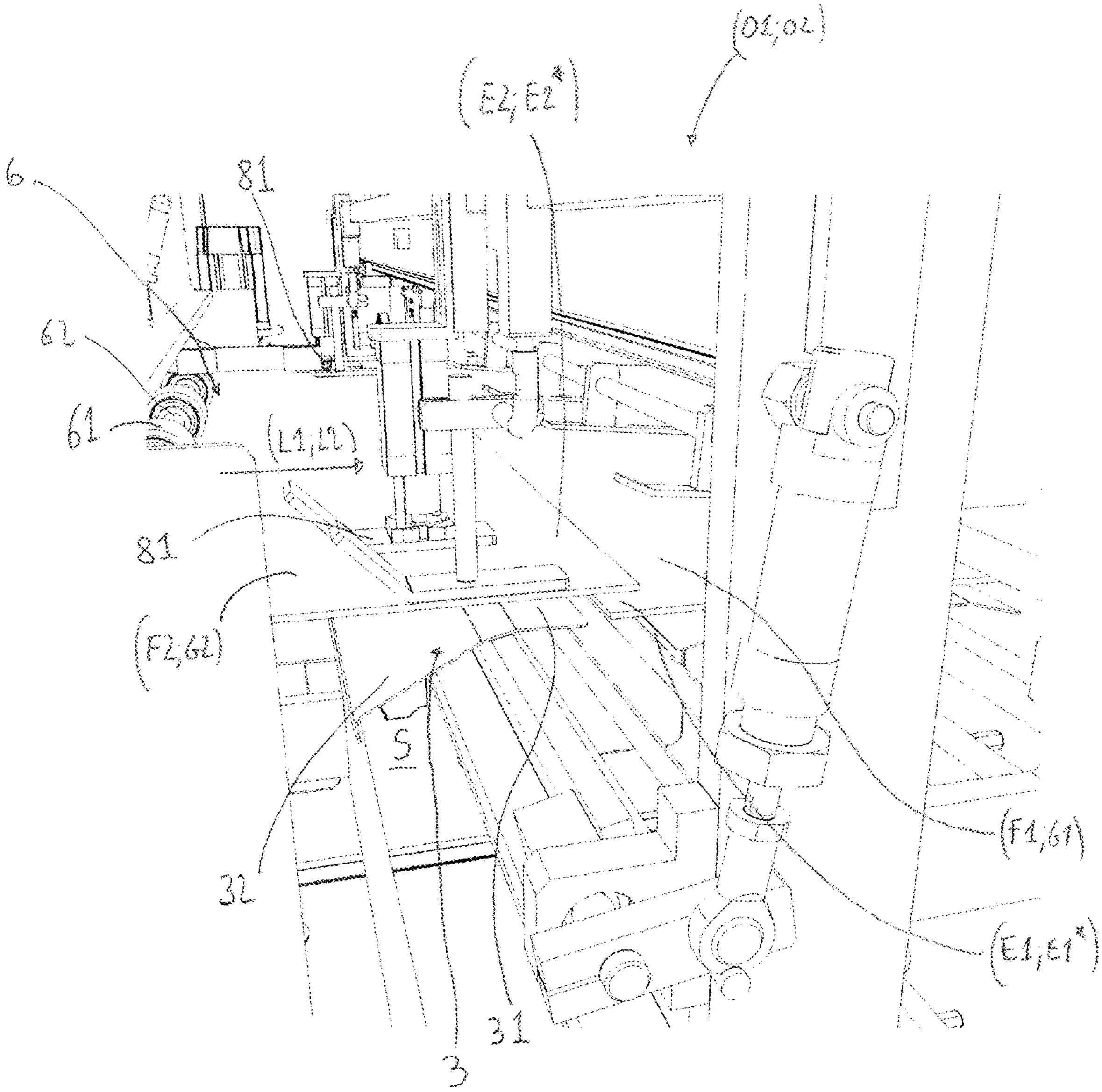
Figure 4C:
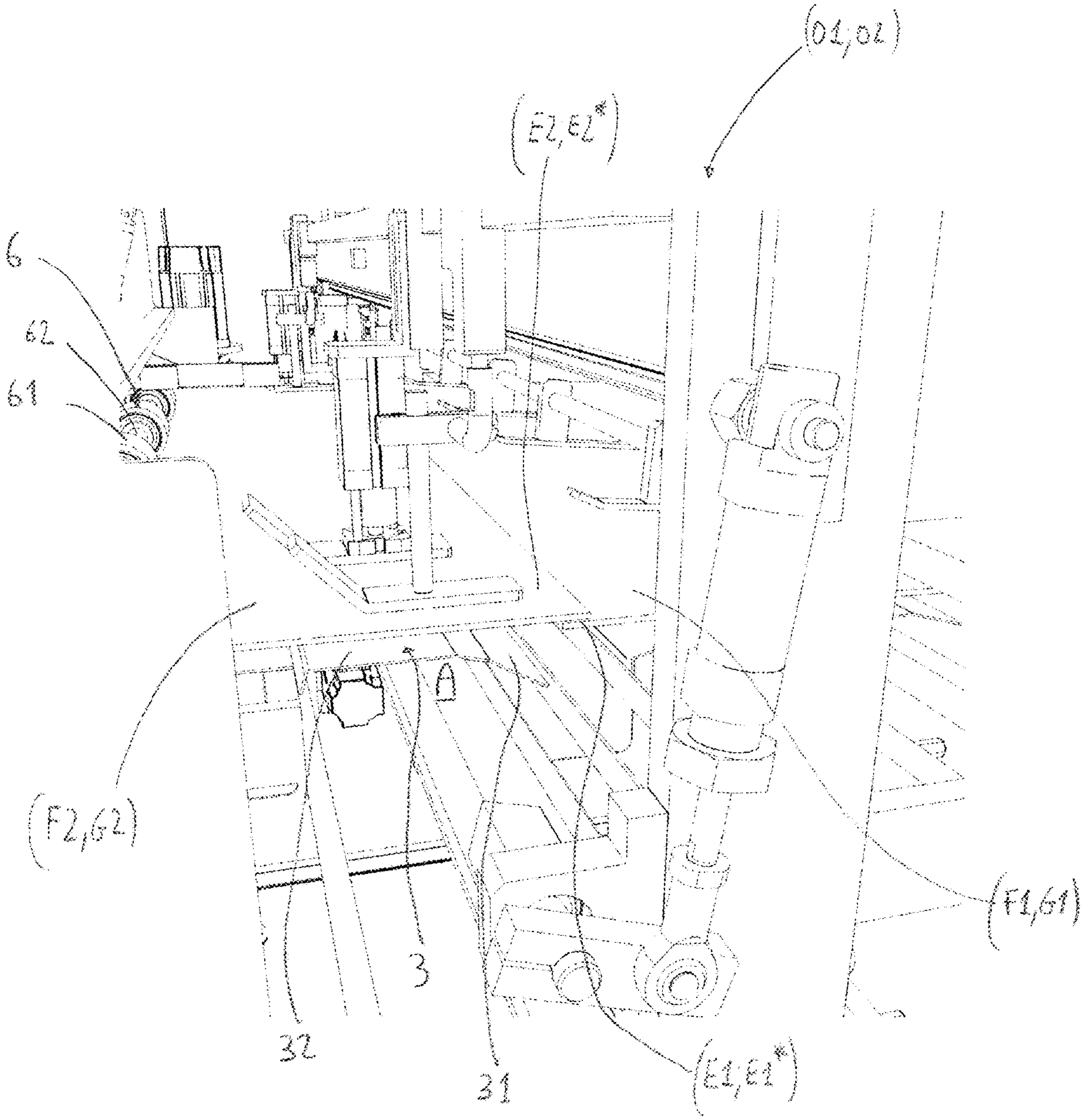
Figure 4D:
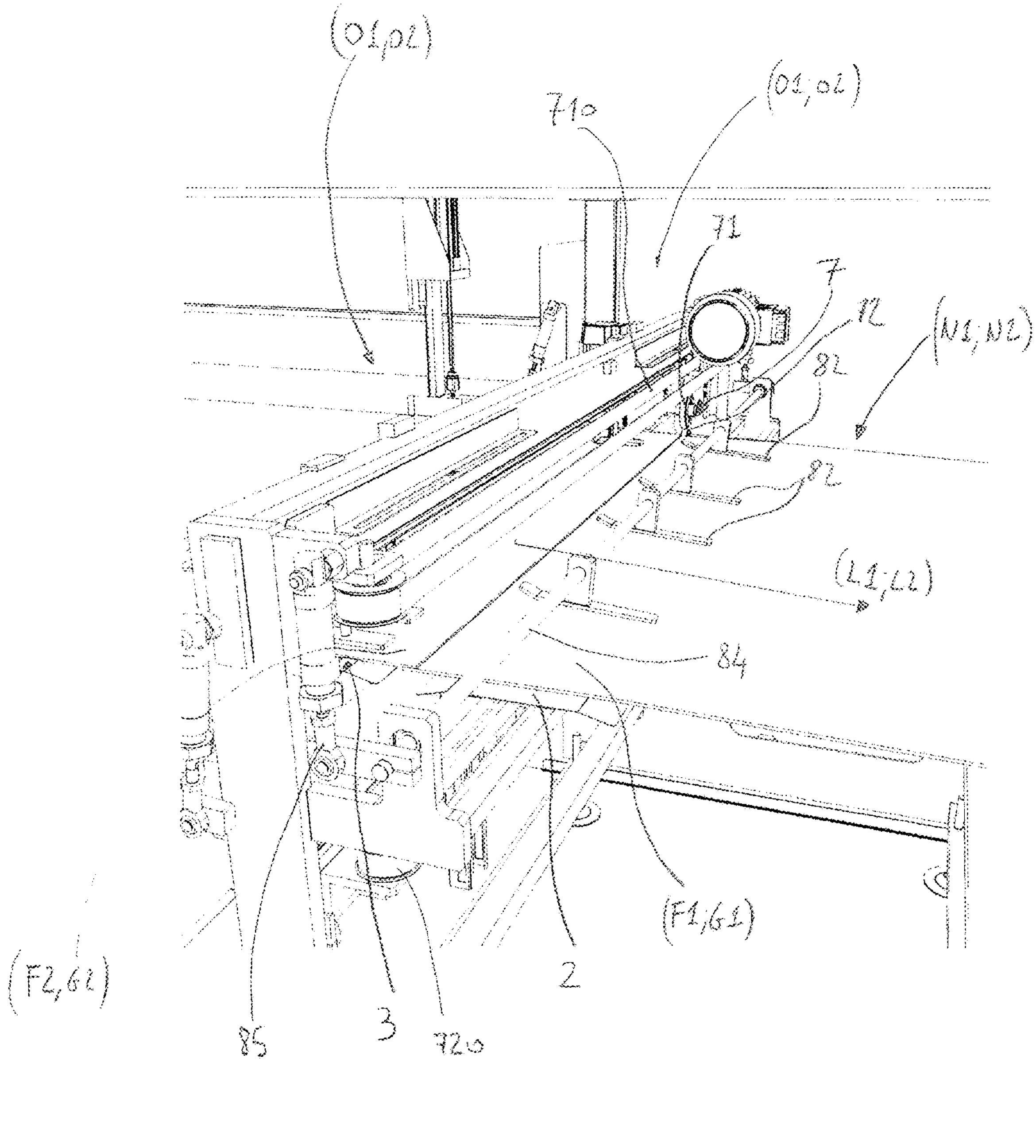
Figure 4E:
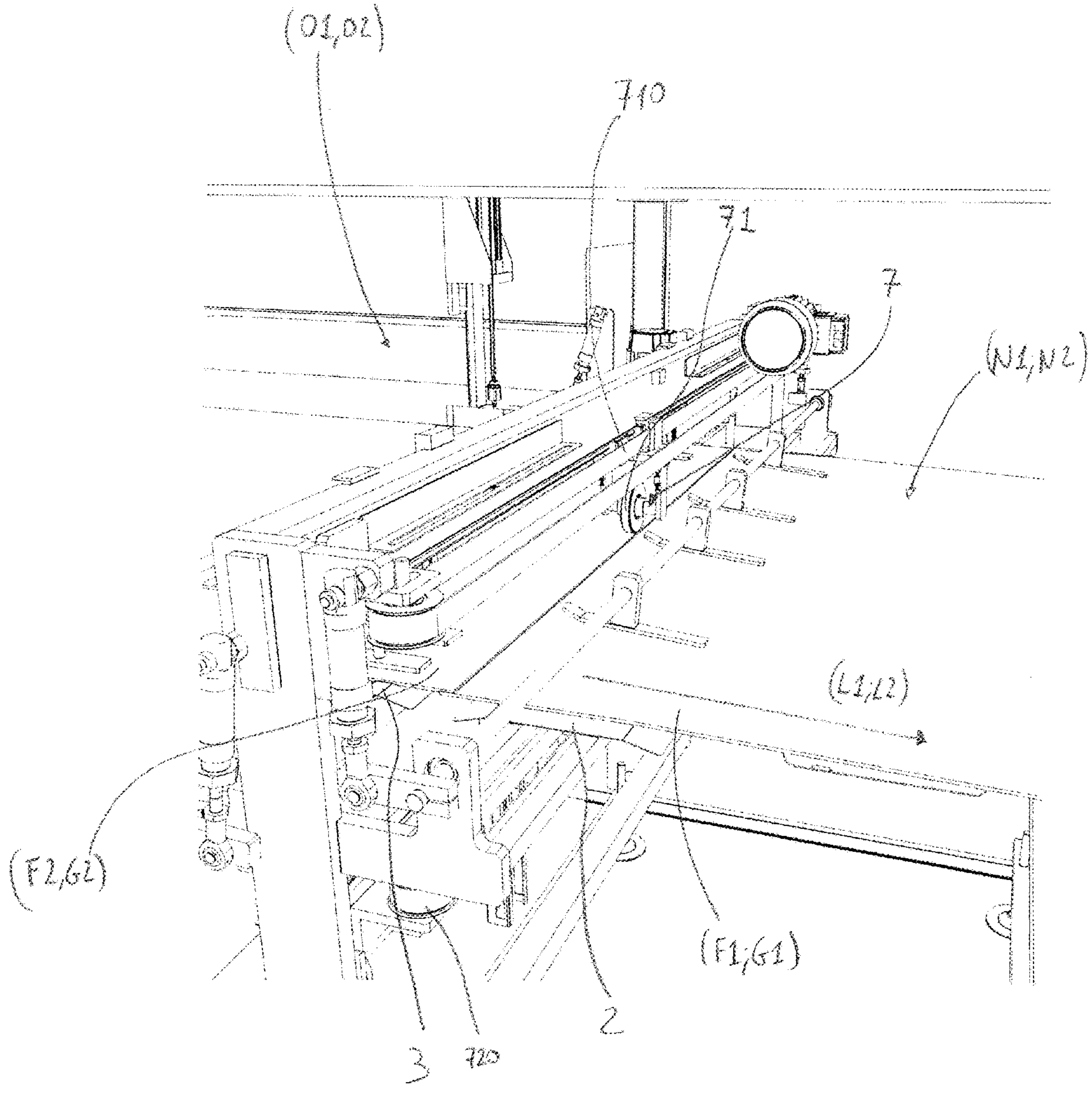
Figure 4F:
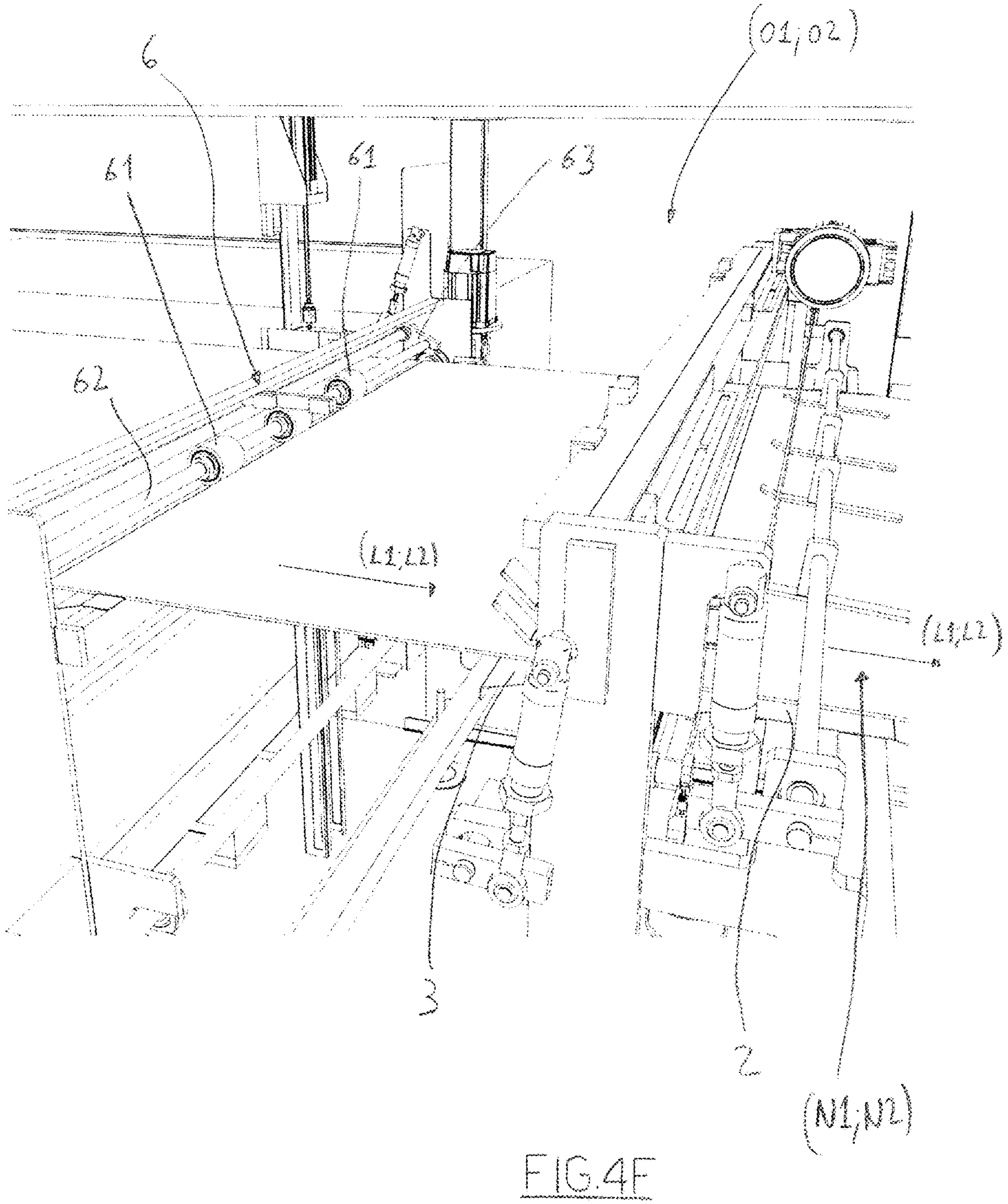

For example, as illustrated in FIGS. 4D and 4E, the two counter-rollers (71, 72) are borne by relative belts (710, 720) loop-wound and arranged transversally to the second support (2) and to the third support (3).

The function of the two counter-rollers is not only to fix the superposed portions of the two sheets to one another by means of the adhesive material, which is compressed, but is also to reduce the thickness of the two superposed portions, so as to obtain a continuous cardboard strip with a thickness that is substantially uniform, including at the joint between the various sheets which form it.

In a further preferred aspect, the third support (3) is conformed in such a way as also to comprise a second part (32), inclined with respect to the part (31), and is such that, when the third support (3) is positioned in the second lowered configuration (A), the second part (32) is arranged in such a way as to support the second successive sheet to be fixed to the preceding sheet arranged on the second support (2), the second end of the second successive sheet being arranged above and in contact with the end portion of the preceding first sheet on which the adhesive material has been applied.

Further, each of the first operating station (O1) and the second operating station (O2) comprises first abutting means (81) which are arranged above the third support (3) so as to be movable vertically in such a way as to be able to abut the upper part of a cardboard sheet, which is transferred towards the second support (2), at the third support (3), when the third support (3) is in the first raised configuration(S).

The first abutting means (81) are further lowerable in order to remain in contact with the cardboard sheet when the third support (3) is brought into the second lowered configuration (A) in order to keep the cardboard sheet laid out during the activating of the pressor means (7).

The presence of the first abutting means (81) thus serves to accompany the cardboard sheet during the lowering thereof and superpose it on the preceding cardboard sheet resting on the second support (2) and, further, in order to keep the cardboard sheet laid out during the activating of the pressor means (7).

Likewise, each of the first and second operating station (O1, O2) further comprises second abutting means (82) which are arranged above the second support (2) and which are movable vertically towards the cardboard sheet positioned on the second support (2), in order to keep the cardboard sheet stretched out during the activating of the pressor means (7). The second abutting means (82) can for example be formed by a series of skate-shaped elements borne by a relative rod (84) which is connected to a piston (85). Clearly, in the foregoing a preferred embodiment of the first and second operating station is described, which can also be made in accordance with other embodiments, aimed at joining successive sheets to form a continuous strip, falling in any case within the scope of the present invention.

The invention claimed is:

1. An apparatus for realising at least two continuous cardboard strips for packaging having different width by consecutively joining to one another at least two respective pluralities of cardboard sheets for packaging of different width, comprising:

a first store, configured for containing a first plurality of cardboard sheets each having a first width, stacked on one another to form a first stack;

a second store, configured for containing a second plurality of cardboard sheets each having a second width, stacked on one another to form a second stack, wherein the second store is arranged upstream of the first store (M1) and at a raised height with respect to the first store;

a first operating station, arranged above the first store and configured to collect a first sheet having the first width from the first stack of sheets, to apply adhesive material on a first transversal end portion of the first sheet, to transfer the first sheet along a first longitudinal advancement direction with respect to the first store and position it downstream of the first store with the first transversal end portion of the first sheet arranged upstream, and then, in succession, to collect a second sheet having the first width from the first stack of sheets, to apply adhesive material on a first transversal end portion of the second sheet, to transfer the second sheet along the first longitudinal advancement direction and position it downstream of the first store in such a way as to superpose a second transversal end portion of the second sheet, opposite the first transversal end portion on which the adhesive material has been applied, above the first transversal end portion of the first sheet on which the adhesive material has been applied, and then to push and press the second transversal end portion of the second sheet against the first transversal end portion of the first sheet in such a way as to fix them to one another and form a first continuous cardboard strip having a width identical to the first width of the sheets present in the first stack of the first store, a second operating station, arranged above the second store configured to collect a first sheet having a second width from the second stack of sheets, to apply adhesive material on a first transversal end portion of the first sheet, to transfer the first sheet along a second longitudinal advancement direction, arranged superiorly to the first longitudinal advancement direction, with respect to the second store and to position the first sheet at a second side downstream of the second store with the first transversal end portion of the first sheet arranged upstream, and then, in succession, to collect a second sheet having the second width from the second stack of sheets, to apply adhesive material on a first transversal end portion of the second sheet, to transfer the second sheet along the second longitudinal advancement direction and to position the second sheet at the second side downstream of the second store in such a way as to superpose a second transversal end portion of the second sheet, opposite the first transversal end portion on which the adhesive material has been applied, above the first transversal end portion of the first sheet on which the adhesive material has been applied, and then to push and press the second transversal end portion of the second sheet against the first transversal end portion of the first sheet in such a way as to fix them to one another and form a second continuous cardboard strip having a width identical to the second width of the sheets present in the second stack of the second store;

a final cutting station, arranged downstream of the first store and of the second store with respect to the first longitudinal advancement direction and to the second longitudinal advancement direction, comprising cutting means for cutting a cardboard sheet from a continuous cardboard sheet;

first directing means, arranged downstream of the first store, configured to advance the first continuous cardboard strip and switch it in such a way that an advanced portion of the first continuous cardboard strip is fed into and positioned at the final cutting station;

second directing means, arranged downstream of the second store, configured to advance the second continuous cardboard strip and switch it in such a way that an advanced portion of the second continuous cardboard strip is fed in and positioned at the final cutting station, above the advanced portion of the first continuous cardboard strip;

first advancement means, arranged in the final cutting station and configured to contact the advanced portion of the first continuous cardboard strip;

second advancement means, arranged in the final cutting station and configured to contact the advanced portion of the second continuous cardboard strip;

wherein, the first advancement means and the second advancement means are alternatively activatable in such a way as to advance the first continuous cardboard strip or the second continuous cardboard strip to the cutting means so that the cutting means can be activated to cut the first continuous cardboard strip, and obtain a first cardboard sheet for packaging having the first width for packaging a respective first article, or a first group of articles, or to cut the second continuous cardboard strip, and obtain a second cardboard sheet for packaging having the second width for packaging a respective second article, or a second group of articles.

2. The apparatus as claimed in claim 1, wherein the first directing means comprise first advancement rollers and a series of first guide plates which are arranged inclined to guide the first continuous cardboard strip which is formed downstream of the first store and to switch the first continuous cardboard strip from the first longitudinal advancement direction towards the entry of the final cutting station, and wherein the second directing means comprise second advancement rollers and a series of second guide plates which are arranged inclined to guide the second continuous cardboard strip, which is formed downstream of the second store, and to switch the second continuous cardboard strip from the second longitudinal advancement direction towards the entry of the final cutting station.

3. The apparatus as claimed in claim 1, wherein the first advancement means comprise at least a first closed and loop-wound belt which is arranged in the final cutting station in such a way as to abut and contact the advanced portion of the first continuous cardboard strip, the first closed and loop-wound belt being activatable in order to advance the first continuous cardboard strip to the cutting means, and wherein the second advancement means comprise at least a second closed and loop-wound belt which is arranged in the final cutting station in such a way as to abut and contact the advanced portion of the second continuous cardboard strip, the second closed and loop-wound belt being activatable to advance the second continuous cardboard strip to the cutting means.

4. The apparatus as claimed in claim 1, wherein the first store is arranged above first lifting means and the second store is arranged above second lifting means, wherein the first lifting means and the second lifting means are configured to lift and/or lower the first store and the second store as a function of the heights of the first stack of sheets and of the second stack of sheets, and/or to maintain the top of the first stack of sheets constantly at a first height from the ground surface and the top of the second stack of sheets constantly at a second height from the ground surface, greater than the first height.

5. The apparatus as claimed in claim 1, wherein, the first operating station and the second operating station are realised and configured in such a way as each to comprise:

a first support, arranged at a first upstream side of the first/second store, which is configured and predisposed to be able to restingly receive a first transversal end portion of a cardboard sheet;

a second support arranged on a second downstream side of the first/second store, opposite the first upstream side, so as to be on the opposite side to the first support with respect to the first/second store, arranged and configured to restingly receive a cardboard sheet so that the first transversal end portion of the cardboard sheet is projecting from the second support and facing towards the first/second store;

a third support, arranged between the second support and the first/second store, and movable between a first raised configuration, in which a part of the third support is raised with respect to the second support, and a second lowered configuration in which the part of the third support is lowered with respect to the second support, gripping means, arranged and configured to pick up a first cardboard sheet from the top of the first/second stack of cardboard sheets present in the first/second store and to transfer to and position the first cardboard sheet at the first support so that a first transversal end portion of the first cardboard sheet is resting on the first support;

application means of an adhesive material, arranged and configured to apply adhesive material on the upper face of the first transversal end portion of the first cardboard sheet rested on the first support;

transfer means, arranged and configured to transfer the first cardboard sheet, on which the adhesive material has been applied, from the first/second store along the first/second longitudinal advancement direction towards the second support, so that the first cardboard sheet is rested on the second support with the relative first transversal end portion on which the adhesive material has been applied remaining projecting and facing upstream towards the first/second store, pressor means, arranged and configured so as to be activatable between the second support and the third support, wherein the third support is activatable in order to be positioned in the first raised configuration, so as to switch and raise a second transversal end portion of a second cardboard sheet which is transferred from the first/second store along the first/second longitudinal advancement direction towards the second support by the transfer means, in such a way that the second transversal end portion of the second sheet which is raised is positioned above the first transversal end portion of the first cardboard sheet on which the adhesive material has been applied and is projecting from the second support, and wherein the third support is then activatable so as to be positioned in the second lowered configuration so as to lower the second transversal end portion of the second sheet and position it at the first transversal end portion of the first sheet on which the adhesive material is present so that the two end portions are in contact with one another, and wherein the pressor means, once the third support has been positioned in the second lowered configuration and the second transversal end portion of the second sheet has been superposed and positioned at the first transversal end portion of the first sheet projecting from the second support, are activatable transversally to the two sheets, between the second support and the third support, so as to press the two superposed end portions of the two sheets to fix them to one another and to form the first/second continuous cardboard strip.

6. The apparatus as claimed in claim 5, wherein the gripping means are configured, when the transfer means have transferred the first cardboard sheet towards the second support, in such a way as to pick up the second cardboard sheet from the top of the first/second stack of cardboard sheets present in the first/second store and to transfer to and position the second cardboard sheet at the first support so that a first transversal end portion of the second cardboard sheet is resting on the first support, and wherein, once the adhesive material has been applied on the first transversal end portion of the second sheet by the application means of adhesive material, the transfer means are configured so as to transfer the second cardboard sheet towards the second support so that a second transversal end portion of the second cardboard sheet, opposite the first transversal end portion on which the adhesive has been applied, can first be raised, by means of the third support positioned in the first raised configuration, and then positioned, following the positioning of the third support in the second lowered configuration, above and in contact with the first transversal end portion of the first cardboard sheet projecting from the second support element.

7. The apparatus as claimed in claim 6, wherein the gripping means, are configured to be cyclically activatable to pick up successive single cardboard sheets from the top of the first/second stack of cardboard sheets present in the first/second store and to cyclically transfer to and position the successive single cardboard sheets at the first support so that a first transversal end portion of the successive single cardboard sheets is resting on the first support and the application means of adhesive material apply the adhesive material on the upper surface of said first transversal end portion;

wherein the transfer means are configured and arranged to cyclically transfer the successive single cardboard sheets, on which the adhesive material has been applied, towards the second support and wherein the third support is cyclically activatable firstly in order to be positioned in the first raised configuration in order to switch and raise a second transversal end portion of the successive single sheets, opposite the first transversal end portion on which the adhesive material has been applied, so that the second end portion of the successive single sheets is positioned above the transversal end portion of a preceding single sheet resting on the second support, on which transversal end portion the adhesive material had been applied, and then activatable so as to be positioned in the second lowered configuration so as to lower the second transversal end portion of the successive single sheets, positioning the second transversal end portion at the transversal end portion of the preceding single sheet on which the adhesive material is applied so that the two end portions are in contact with one another, and wherein, cyclically, the pressor means, once the third support has been positioned in the second lowered configuration and the second transversal end portion of the successive sheets has been superposed and positioned on the transversal end portion of the preceding sheet, are activatable in such a way as to press the two transversal end portions of the two sheets to one another and form the first/second continuous cardboard strip.

8. The apparatus as claimed in claim 7, wherein the gripping means are configured to collect, by suction, a cardboard sheet from the top of the first/second stack of cardboard sheets present in the first/second store and transfer the cardboard sheet towards the first support so that a first transversal end portion of the cardboard sheet is resting on the first support, and are configured, once the application means of the adhesive material have applied adhesive material on the upper surface of the first transversal end portion of the cardboard sheet rested on the first support, so as to transfer the cardboard sheet in the direction of the second support, by sliding it on the first/second stack of cardboard sheets, and then release the cardboard sheet to enable the transfer means to further transfer the cardboard sheet along the first/second longitudinal advancement direction towards the second support.

9. The apparatus as claimed in claim 8, wherein the gripping means comprise a series of suction gripping elements borne, vertically movable, by a first frame activatable in translation above the first/second stack of sheets present in the first/second store, towards the first support and towards the second support.

10. The apparatus as claimed in claim 5, wherein the transfer means comprise rollers mounted on a shaft activatable in rotation by a motor, the shaft is borne by a second frame that is movable vertically so as to be able to lower the rollers in such a way that the rollers abut the cardboard sheet on which the adhesive material has been applied and, when activated in rotation by the rotation of the shaft, transfer the cardboard sheet towards the second support.

11. The apparatus as claimed in claim 10, wherein the second frame is arranged between the third support and the first/second store.

12. The apparatus as claimed in claim 5, wherein the pressor means comprise two counter-rollers.

13. The apparatus as claimed in claim 5, wherein the third support is conformed in such a way as also to comprise a second part, inclined with respect to the part and is such that, when the third support is positioned in the second lowered configuration, the second part is arranged in such a way as to support the second successive sheet to be fixed to the preceding sheet arranged on the second support, the second end portion of the second successive sheet being arranged above and in contact with the end portion of the preceding first sheet on which the adhesive material has been applied.

14. The apparatus as claimed in claim 5, wherein each of the first operating station and the second operating station, comprises: first abutting means which are arranged above the third support so as to be movable vertically in such a way as to be able to abut the upper part of a cardboard sheet, which is transferred towards the second support at the third support, the first abutting means being further lowerable in order to remain in contact with the cardboard sheet when the third support is brought into the second lowered configuration in order to keep the cardboard sheet laid out during the activating of the pressor means; and comprises second abutting means which are arranged above the second support and which are movable vertically towards the cardboard sheet positioned on the second support, in order to keep the cardboard sheet stretched out during the activating of the pressor means.

* * * * *